April 3, 1934.    J. JONAS    1,953,233
PROTECTIVE SYSTEM
Filed Sept. 12, 1931
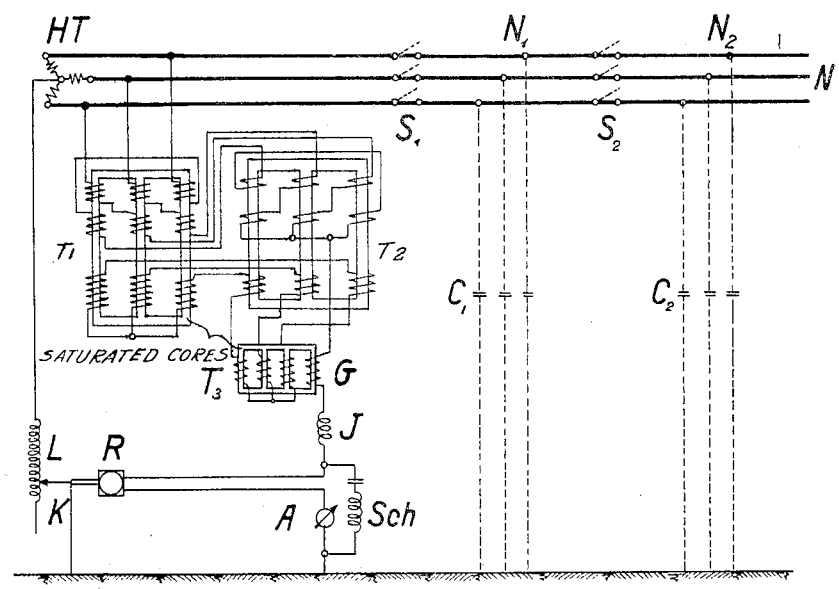
Inventor
Julius Jonas
by Alfred H. Dyson
Attorney Patented Apr. 3, 1934

1,953,233

UNITED STATES PATENT OFFICE 1,953,233

PROTECTIVE SYSTEM

Julius Jonas, Baden, Switzerland

Application September 12, 1931, Serial No. 562,492
In Germany September 13, 1930

6 Claims. (Cl. 172—237)

For the protection of high voltage systems against earthfaults, earthing inductors are often used which are so dimensioned that they are approximately in resonance with the partial capacitance of the system to earth. They may be connected for this purpose between the conductors of the system and earth or between the star-point of a winding connected to the system and earth. It is very difficult however, to maintain resonance under all conditions in systems in which it is necessary to take into consideration the switching in and out of portions of the same, since each alteration of the partial system results in an alteration of the partial capacitance to earth and consequently a different adjustment of the inductance of the extinguishing coil to procure the corresponding value of the extinguishing induction which affords protection. As the earthfault protection apparatus is only connected to the system in most cases at one or few points of the network, it is necessary that the alteration in the length of the net work, brought about by switching in or out portions of the system, be immediately signalled to every station in which extinguishing inductors are situated, in order that a corresponding adjustment to the inductance of the extinguishing inductors may be made. The result of this is that the service of the system is made complicated and difficult, demanding a means of mutual understanding which is continuously maintained between the stations and switching points which are remotely situated from each other. A great technical improvement would be possible if the earthfault extinguishing inductance were automatically adjusted to the value corresponding to the existing length of the high voltage system protected by it.

The object of the present invention is, therefore, a device for the automatic adjustment of an earthfault extinguishing inductor to the value corresponding to the existing length of the high voltage system protected by it. In accordance with the invention the star-point (or neutral point) of a winding in circuit with the high voltage system shall be connected to earth over a voltage source of other frequency than the system and over an (auxiliary) inductance to earth, the inductance being of such a magnitude that the circuit comprising the system, the earthing circuit and the partial capacitances of the system to earth, will be approximately in resonance relative to the said other frequency within the shortest and longest lengths of the system in service. Further, switching apparatus shall be provided which adjusts the extinguishing inductor according to the existing length of the system in dependence on the current or the reactance of the circuit to earth. The E. M. F. of the source having a different frequency from the system (which frequency is suitably chosen higher than the frequency of the system) is operative in the circuit to earth. The circuit to earth contains an impedance which is built up of the ohmic resistances of both the conductor itself and the connection to earth of the auxiliary inductance, of the leakage inductance, of the winding forming the star-point, of the inductance, of the system and finally of the partial capacitance of the system to earth. Should portions of the system be switched in or out, the only appreciable alteration will be that of the partial capacitance of the system to earth: The alteration of the total inductance and of the ohmic resistance due to the addition or subtraction of parts of the system may be neglected. The alteration of the current in the circuit to earth is therefore primarily a function of the partial capacitance to earth, that is the length of network, and the current changes as a result of the alteration of the reactance $$\left(L - \frac{1}{C}\right)$$

of the circuit to earth. For this reason an instrument measuring reactance may be employed instead of one measuring current. In order, however, that the sensitivity of the measuring instrument may be such that it suffices to operate the switching apparatus, it is essential, as stated above, that the auxiliary inductance be of such a magnitude that a resonance exists, at least approximately, for the longest or the shortest lengths of system in relation to the frequency other than that of the network. When portions of the system are switched in or out the measured value of the current changes from the value of resonance. Actually the measured values then lie on the steep part of the resonance characteristic. By these means the sensitivity of the device and the accuracy of measurement are assured.

In order that the measurement shall, however, be definite, it is necessary to have a constant voltage in the auxiliary source which is independent of the voltage of the fundamental frequency, or if this constancy is not originally given some device must be provided to ensure it. The frequency other than that of the network should also be as constant as possible and, to enable the use of stationary apparatus for its generation, it is advantageous to choose it as a multiple of the system frequency. In three-phase systems for example, the 3$n$th harmonic may be readily generated as the other frequency (where $n$ is a whole number) in stationary apparatus by the saturation of the iron core of a three-phase coil fed with the constant voltage of the fundamental frequency. If a highly saturated three-phase choke coil is connected to the three-phase network, the field for its generation, with a sine wave, requires a strong third harmonic, which, however, has the same direction in all three phases and can therefore only flow to or away through a lead connected to the star-point. If the voltage of the system alter, the saturation of the choke coil and accordingly the E. M. F. of the third harmonic alters too. For this reason it is advantageous in order that the E. M. F. may be as independent as possible of the alteration of the voltage of the system, that the core of the highly saturated three-phase choke coil be provided with a fourth limb, the field of which induces a voltage of the 3$n$th harmonic in a coil arranged on this limb and inserted in the earthing circuit. In order now to supply this three-phase choke coil with as constant a voltage as possible it is connected in such a manner to the reversed secondary windings of two primary three-phase transformers, which are connected to the high voltage system and of which one is given a high and the other a low iron saturation, that the drooping of the voltage characteristic of the under saturated transformer is approximately equal to the drooping of that portion of the voltage characteristic of the highly saturated transformer which lies in the range of high saturation.

If the secondary windings in series are therefore connected to the highly saturated choke coil which is built with a fourth limb, the field induced by the third harmonic in the fourth limb is practically constant and independent of fluctuations in the high voltage system. Accordingly, the E. M. F. of the third harmonic induced in the winding arranged on the fourth limb has a constant value and can be used as the constant voltage of other frequency than that of the system, in the circuit to earth. To this end the winding on the fourth limb of the three-phase coil is connected on one side to the circuit to earth and on its other, in order to save a special connecting transformer for the earth circuit, to the star-point of the primary winding of the under saturated transformer used for producing the constant voltage. This transformer, however, should not have a high inductive resistance to the current of the third harmonic, and for this reason it is supplied with a third winding which is connected in star which compensates the ampere turns of the third harmonic. It is also possible for the two transformers which serve for the generation of the constant voltage to be built with their primary windings in zig-zag connection, as this arrangement with two equal phase windings per voltage phase possesses the property that the third harmonic may pass through without resistance.

It can occur that the resonance characteristic is of abnormally steep shape with the result that the device will be too sensitive. In such a case it is possible, by including a damping resistor in the earth current circuit, to obtain a flatter characteristic in the neighbourhood of the resonance point and thus to adjust the sensitivity to a practical value.

Since in accordance with the described device the measured value of the current of the 3$n$th harmonic should not only be independent of voltage fluctuations in the high voltage system but also of the currents of the fundamental frequency it is necessary in order to keep these currents from influencing the measuring and switching instruments, to short circuit them through a resonance circuit consisting of capacitance and self induction which is tuned to the fundamental frequency. The types of instruments used are those indicating the value to which the extinguishing inductance is adjusted (ammeters, reactance meters or similar) and those such as switching relays which, carrying the current of the earthing circuit, adjust the inductance of the extinguishing coil to the value corresponding to the existing length of the system.

Referring now more particularly to the single figure of the drawing, as illustrating, in diagrammatic fashion, one embodiment of the invention, by characters of reference, the reference letter N indicates the conductors of a three-phase system with $N_1$ and $N_2$ sections subject to connection and disconnection by the switches $S_1$ and $S_2$. HT is the secondary winding of the main transformer supplying the system. Connected with the star-point of this winding is the arc extinguishing choke (inductance) coil L, the induction of which may be adjusted by the tapping contact K in connection with earth. The primary windings of the transformers $T_1$ and $T_2$ are connected to the system N. The secondary windings of these transformers are connected in series but opposed to one another. Transformer $T_1$ has a highly saturated core while the core of transformer $T_2$ is weakly saturated and dimensioned in such a manner that the drooping of its voltage characteristic is approximately equal to the drooping of the portion of the voltage characteristic of the highly saturated transformer $T_1$ in region of high saturation. Due to this arrangement the voltage obtained from the series connected secondary windings of the two transformers is constant and over a large range independent of any change in the voltage of the system N. This constant voltage is now led to the terminals of the three-phase choke coil $T_3$ the core of which is also highly saturated. It is provided with a fourth limb on which the winding G is arranged. In this coil G, voltages of the third harmonic are induced and it represents therefore the source of current for the supply at 3$n$th frequency. One side of the coil G is connected to the star-point of the primary winding of transformer $T_2$ while the other side goes to the auxiliary inductor J, the switching relay R and the ammeter A and thence to earth. The switching relay R and the ammeter A are bridged by a resonance circuit Sch, tuned to the fundamental frequency. To prevent undue resistance to the flow of currents of the 3$n$th harmonic in the primary winding of transformer $T_2$ this winding is connected in zig-zag. In order, however, that the phase angle in the secondary windings of the two transformers $T_1$ and $T_2$ shall be the same, the primary winding of the transformer $T_1$ is also connected in zig-zag. $C_1$ and $C_2$ represent the partial capacitances to earth of the portions $N_1$ and $N_2$ of the system. It is assumed that the partial capacitance of the portion of the system in direct connection with the transformer HT is negligibly small as compared with that of the other portions.

Assuming now the switches $S_1$ and $S_2$ to be closed and the inductor J so dimensioned that the circuit comprising the primary windings of transformers $T_1$ and $T_2$, auxiliary inductors G and J, partial capacitances $C_1$ and $C_2$, and the line conductors (the inductance coil L and the transformer winding HT being in parallel connection with capacitances $C_1$, $C_2$) are in approximate resonance with reference to the $3n$th frequency, maximum current of $3n$th frequency will flow through relay R and ammeter A. If, however, the switch $S_2$ be opened and the line section $N_2$ thereby disconnected the circuit will no longer be in resonance to the $3n$th frequency and the magnitude of the current flowing therein being within the range of the steep part of the resonance characteristic will be greatly reduced. The current in relay R and in the ammeter A attains therefore its highest value when the full system is switched in. If for example the switch $S_2$ is then opened $C_2$ is no longer in the earth circuit and this circuit is correspondingly placed out of resonance. The current in the instruments reduces in a relatively large proportion because the value measured is on the steep part of the resonance characteristic. The lever K will now be moved in proportion to the altered value of the current measured and the extinguishing coil L automatically adjusted to a value corresponding to the value of capacitance $C_1$.

The harmonic of the $3n$th harmonics which can be used for actuating the instruments is in itself of no importance; in general, however, the third harmonic will be preferred as it possesses relatively the highest amplitude and will therefore deliver sufficient power for the actuation of the switching relay. On the other hand the voltage of the $3n$th harmonic operating between the neutral point of the system and earth should not be too great in relation to the voltage of the system as it alters the potential of the system relative to earth and therefore increases the voltage of the conductors of the system above earth potential. The switching device and measuring instruments may be indirectly instead of directly connected in the earthing circuit for example by connecting them inductively.

The auxiliary inductor which has to withstand besides the voltage of the $3n$th harmonic in certain cases also high voltages between the neutral point and earth which arise should be designed for the maximum voltage which it will be called upon to withstand. In order that this voltage shall be as low as possible it is advisable either to provide the system in a known manner with special apparatus which maintain its symmetry or to keep the quenching inductance, so far removed from resonance that the high voltages between neutral point and earth remain within certain limits.

It is claimed and desired to secure by Letters Patent:

1. In a system for protecting electric transmission lines and the like from the effects of ground fault connections, a transmission line divided into a plurality of inter-connectible sections having capacitances between the conductors thereof and ground and having a plurality of neutral point connections, a source of alternating current connected with and supplying said line, a variable inductance connected between one of said neutral point connections and ground, an auxiliary inductance arranged about a highly saturated core connected with ground and with said line by way of another of said neutral point connections, means connected with said line and energized from said source coupled with and operable to induce in said auxiliary inductance currents having a harmonic frequency of $3n$ ($n$ being any whole number) times the fundamental frequency of said source, and relay means included in the connection between said auxiliary inductance and ground operable responsive to and in extent in dependence upon the magnitude of current of said harmonic frequency flowing in said line as determined by the capacitance to ground of the connected sections thereof for causing variations in the effective value of the first said inductance.

2. In a system for protecting electric transmission lines and the like from the effects of ground fault connections, a transmission line divided into a plurality of inter-connectible sections having capacitance to ground and a plurality of neutral point connections, a source of alternating current connected with and supplying said line, an inductance connected between one of said neutral point connections and ground adjustable to approximate resonance with the capacitance of said line to ground at the fundamental frequency of said source of current, an auxiliary inductance connected between another of said neutral points and ground dimensioned to approximate resonance with the capacitance of said line to ground at a frequency of $3n$ ($n$ being any whole number) times the fundamental frequency of said source, means connected with said line and energized by said source of current operable to produce therefrom current of said harmonic frequency, magnetic core means linking the said auxiliary inductance with said means for inducing current of said harmonic frequency in the latter, and means operable responsive to flow of said current of harmonic frequency through said line by way of said auxiliary inductance for causing adjustments of the first said inductance in extent in dependence upon the value of the capacitance to ground of connected sections of said line at said harmonic frequency.

3. In a system for protecting electric transmission lines and the like from the effects of ground fault connections, a transmission line comprising a plurality of inter-connectible sections having capacitance to ground and having a plurality of neutral point connections, a source of alternating current connected with and supplying said line, a variable inductance connected between one of said neutral point connections and ground, polyphase inductance coil windings arranged on three legs of a highly saturated four legged core and having a star point connection, an auxiliary inductance arranged on the fourth leg of said core connected with another of said plurality of neutral point connections and with ground, means connected with said polyphase windings and energized from said source of current operable to induce in said auxiliary inductance current having a harmonic frequency of $3n$ ($n$ being any whole number) times the fundamental frequency of said source, and means included in the said connection of said auxiliary inductance operable responsive to flow of current of said harmonic frequency therethrough by way of connected sections of said line and the capacitance to ground thereof to cause variations in the effective value of the first said inductance in extent in dependence upon variations of the capacitance of connected sections of said line to ground.

4. In a system for protecting electric transmission lines and the like from the effects of ground fault connections, a transmission line divided into a plurality of inter-connectible sections having capacitance between the conductors thereof and ground and having a plurality of neutral point connections, a source of alternating current connected with and supplying said line, a variable inductance connecting one of said neutral point connections with ground and adjustable to approximate resonance with the capacitance of connectible sections of said line to ground at the fundamental frequency of said source, an auxiliary inductance arranged on a highly saturated core connected with ground and with said line by way of another of said neutral point connections so dimensioned as to be in approximate resonance with the capacitance of said line to ground within the minimum and maximum range of the capacitance of the connectible sections thereof to ground at a harmonic frequency of $3n$ ($n$ being any whole number) times the fundamental frequency of said source, means arranged about said core and inductively coupled with said auxiliary inductance operable to induce in the latter voltages of said harmonic frequency, transformer means having primary windings connected with said line and energized from said source, and secondary windings so arranged and connected as to cause currents of said harmonic frequency to flow in said means and induced thereby in said auxiliary inductance at substantially constant voltage regardless of variations within wide limits of the voltage of said source of current, and control means serially connected in circuit with the said auxiliary inductance operable responsive to flow of current of said harmonic frequency in connected sections of said line by way of the capacitance thereof to ground to adjust the first said inductance to approximate resonance with the capacitance to ground of connected sections of said line regardless of variations of the voltage of the first said source of current.

5. In combination with an electrical transmission line, a source of alternating current connected with said line and having a neutral point, and an inductance connecting said neutral point with ground and adjustable to approximate resonance with the capacitance of said line to ground at the fundamental frequency of said source of current, of an auxiliary inductance connected with said line and with ground, means inductively connected with said line and said auxiliary inductance and energized from said source operable to produce and induce in said auxiliary inductance current having a harmonic frequency of $3n$ ($n$ being any whole number) times the fundamental frequency of said source, the said auxiliary inductance being so dimensioned as to be approximately resonant to the capacitance of said line to ground at the said harmonic frequency, and means operable responsive to the flow of said current of harmonic frequency through said auxiliary inductance by way of said line and the capacitance to ground thereof to adjust the first said inductance to approximate resonance with the capacitance to ground of said line at the fundamental frequency of said source, the dimensions and connections of the first said means being such as produce current of said harmonic frequency at substantially constant voltage regardless of variations of the voltage of said source of current.

6. In combination, with an electric transmission line having capacitance to ground and having a plurality of neutral point connections, a source of alternating current connected with and supplying said line, and an inductance connected between one of said neutral point connections and ground adjustable to approximate resonance with the capacitance of said line to ground at the fundamental frequency of said source, of means comprising a multi-coil inductance arranged on a highly saturated core inductively connected with said line and energized from said source operable to produce current having a harmonic frequency of $3n$ ($n$ being any whole number) times the fundamental frequency of said source, the said means being linked with an auxiliary inductance connected between another of said neutral point connections and ground so dimensioned as to be approximately resonant to the capacitance of said line to ground at the said harmonic frequency and constituting a path for the flow of current of said harmonic frequency by way of said line and the capacitance to ground thereof, a relay means, and an indicating device included in the said connection of said auxiliary inductance operable responsive to flow of current of said harmonic frequency to adjust the effective value of the first said inductance, and to indicate the magnitude of current of said harmonic frequency flowing in said line as determined by the capacitance to ground thereof.

JULIUS JONAS.